(12) United States Patent
Bargheer et al.

(10) Patent No.: US 7,100,992 B2
(45) Date of Patent: Sep. 5, 2006

(54) SAFETY DEVICE FOR A MOTOR VEHICLE SEAT

(75) Inventors: Claudio Bargheer, Holzgerlingen (DE); Roland Beisswenger, Lorch-Unterkirneck (DE); Dirk Benthaus, Boeblingen (DE); Michael Eichler, Uhingen (DE); Thomas Foelster, Grafenau (DE); Alexander Koblischke, Renningen-Malmsheim (DE); Uwe Nagel, Schwaebisch Gmuend (DE); Kai-Thorsten Schmiedl, Altdorf (DE); Ulrich Tschaeschke, Ehningen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/485,691

(22) PCT Filed: Jul. 30, 2002

(86) PCT No.: PCT/EP02/08456

§ 371 (c)(1),
(2), (4) Date: Aug. 23, 2004

(87) PCT Pub. No.: WO03/013915

PCT Pub. Date: Feb. 20, 2003

(65) Prior Publication Data

US 2005/0006933 A1    Jan. 13, 2005

(30) Foreign Application Priority Data

Aug. 3, 2001    (DE) ................................ 101 37 634

(51) Int. Cl.
*B60R 21/20* (2006.01)

(52) U.S. Cl. ................................ 297/730.2; 280/728.3; 297/216.3

(58) Field of Classification Search ............. 297/216.1, 297/216.13, 216.14; 280/728.2, 728.3, 730.1, 280/730.2, 732
See application file for complete search history.

(56) References Cited

U.S. PATENT DOCUMENTS 5,531,471 A * 7/1996 Terai ........................... 280/732
5,803,490 A * 9/1998 Seventko et al. ........ 280/730.2

(Continued)

FOREIGN PATENT DOCUMENTS

DE    296 01 257 U1    3/1996

(Continued)

OTHER PUBLICATIONS

International Search Report (PCT/ISA/210).

*Primary Examiner*—Peter R. Brown
(74) *Attorney, Agent, or Firm*—Crowell & Moring LLP

(57) ABSTRACT

In order a safety device for a motor vehicle seat having a seat cushion part and a backrest, the backrest having a frame, a backrest cover, which faces rearward as seen in the direction of travel, and padding which faces forward, as seen in the direction of travel, and an airbag module is integrated into the backrest, said airbag module being arranged in that region of the backrest which faces the side wall structure of the motor vehicle in such a manner that an airbag is deployed when there is an impact between a driver and the side wall of the motor vehicle, said safety device ensuring a reliable and reproducible emergence of the airbag, it is proposed to arrange the airbag module to the rear of the backrest frame, when looking from the side wall of the motor vehicle.

31 Claims, 3 Drawing Sheets

U.S. PATENT DOCUMENTS

| | | | |
|---|---|---|---|
| 5,816,610 A * | 10/1998 | Higashiura et al. | 297/216.13 |
| 5,826,938 A * | 10/1998 | Yanase et al. | 297/216.13 |
| 5,845,932 A * | 12/1998 | Kimura et al. | 280/730.2 |
| 5,863,063 A * | 1/1999 | Harrell | 280/730.2 |
| 5,893,579 A * | 4/1999 | Kimura et al. | 280/730.2 |
| 5,927,749 A * | 7/1999 | Homier et al. | 280/730.2 |
| 6,095,602 A * | 8/2000 | Umezawa et al. | 297/216.1 |
| 6,155,593 A | 12/2000 | Kimura et al. | |
| 6,352,304 B1 * | 3/2002 | Sorgenfrei | 297/216.13 |
| 6,386,577 B1 * | 5/2002 | Kan et al. | 297/216.13 |
| 2002/0060447 A1 * | 5/2002 | Acker et al. | 280/730.1 |

FOREIGN PATENT DOCUMENTS

| | | |
|---|---|---|
| DE | 197 46 234 A1 | 4/1999 |
| DE | 200 17 919 U | 3/2001 |
| DE | 200 17 919 U1 | 3/2001 |
| EP | 0 940 298 A | 9/1999 |
| JP | 10 287196 A | 1/1999 |

\* cited by examiner

SAFETY DEVICE FOR A MOTOR VEHICLE SEAT

CROSS REFERENCE TO RELATED APPLICATIONS

This application is a national phase of International Patent Application No. PCT/EP02/08456, filed Jul. 30, 2002, designating the United States of America, and published in German as WO 03/013915, the entire disclosure of which is incorporated herein by reference. Priority is claimed based on German Patent Application No. 101 37 634.0, filed Aug. 3, 2001.

BACKGROUND AND SUMMARY OF THE INVENTION

The invention relates to a safety device for a motor vehicle seat.

Safety devices of this type are known, for example, from the utility model DE 200 17 919 U1. They are suitable for a motor vehicle seat having a seat cushion part and a backrest. The backrest has a frame, a backrest cover, which faces rearward as seen in the direction of travel, and padding which faces forward, as seen in the direction of travel. An airbag module is integrated into the backrest and is arranged in that region of the backrest which faces the side wall structure of the motor vehicle. The airbag is deployed when there is an impact between a driver and the side wall structure of the motor vehicle, for example the B-pillar and/or the side door.

In the known safety device, the airbag module is arranged between the frame and the backrest cover, so that it is placed to the rear of the backrest cover and in front of the frame, as seen from the side wall structure. An airbag outlet opening is provided in the region in which the backrest cover and padding butt against each other. This known arrangement has the disadvantage that, if there is a side impact, structural parts penetrating the interior of the motor vehicle may jeopardize the interference-free emergence of the airbag. This situation may occur, for example, if the penetrating parts butt against the backrest cover and deform it, and the airbag outlet opening is thus concealed or the airbag module arranged to the rear of the backrest cover is damaged. Deformation of the backrest cover is possible, since the backrest cover serves to line the motor vehicle seat and is therefore not of sufficiently stable design.

Against this background, it is the object of the present invention to develop a safety device in such a manner that reliable and reproducible emergence of the airbag is ensured.

This object is achieved according to the invention by a safety device for a motor vehicle seat that includes a seat cushion part, a backrest having a frame, a backrest cover, which faces rearward as seen in the direction of travel, and padding which faces forward, as seen in the direction of travel. The safety device includes an airbag module that has an airbag, and the airbag module is integrated into the backrest and arranged in a region of the backrest which faces a side wall structure of the motor vehicle. The airbag module 11 is at least partially surrounded the frame 5 and is arranged to the rear of the frame 5 when looking from the side wall structure of the motor vehicle.

Accordingly, the invention is distinguished by the fact that the airbag module is arranged, as seen from the side wall structure, to the rear of the backrest frame—i.e. to the rear of its supporting part in the backrest. The effect of this arrangement is that the airbag module is shielded against forces acting from the direction of the side wall structure. In addition, an airbag outlet opening can be effectively protected against penetrating structural parts and it can therefore be ensured that the opening is always free for an airbag to emerge. The backrest frame is preferably designed in such a manner that virtually no deformation occurs. In the event of a lateral application of force, the entire backrest together with the seat cushion part is rather displaced in the direction of the center of the motor vehicle than the frame is lastingly deformed. A backrest frame of this type can consist, for example, of magnesium diecasting.

A further advantage of the invention can be seen in the fact that the construction is very simple because no additional measures are necessary in order to ensure that the airbag deploys reliably. On the contrary, existing parts of the backrest are used in order to bring this about. Accordingly, the arrangement according to the invention of the airbag module in the backrest ensures that the airbag is deployed or emerges considerably more reliably.

According to one embodiment, the airbag module has a housing which at least partially surrounds the airbag, for example in the rear region and in the side regions. Since the housing does not completely surround the airbag module, it therefore has a relatively wide opening. This means that the housing provides a relatively small resistance to the deploying airbag thus assisting a reliable deployment.

A plate can be provided in the region in which the housing does not surround the airbag module. This plate serves, on the one hand, to close the airbag housing and therefore to provide a certain protection in the inoperative state to the airbag components arranged in the housing. Furthermore, it serves to damp the first thrust of the deploying airbag, with the result that the airbag emerges at a moderate speed. Finally, the plate enables the airbag to emerge. When, during deployment, the airbag presses against the plate, the plate is bent up and pushes the backrest components, which join the plate, for example the padding, to the side. For this purpose, the plate is preferably arranged on that side of the frame which faces away from the outer contour of the seat that faces the side wall structure.

The plate can be connected on one side fixedly to the frame of the backrest. When the airbag emerges, this fixed connection forms a hinge about which the plate moves. However, it is also conceivable for the plate to be connected directly to the airbag housing and for it to be pivoted open from this connection.

The function of the plate may also be fulfilled by other components of the backrest. If, for example, the padding is arranged on a padding support, then it is conceivable for this padding support, which is likewise arranged between the padding and airbag module, to take over the closing, damping and opening.

According to a further embodiment, the frame at least partially surrounds the airbag module. The frame preferably surrounds the airbag module in the regions in which the housing surrounds the airbag. This arrangement enables the airbag to be protected in a particularly reliable manner against actions from the outside—in particular from the rear and from the side, as a result of which damage to the airbag module is prevented, ensuring an interference-free deployment of the airbag. This arrangement is therefore particularly advantageous because no additional elements are necessary in order to achieve this protection. The airbag is simply arranged in structures which are already present. In addition, the frame can serve as a guiding device by being aligned in such a manner that it predetermines the direction of deployment.

The outlet or the outlet opening for the airbag may be provided, for example, between the frame and padding. The material combination of a rigid frame and elastic padding, which are also coordinated with each other in terms of their shape, makes it possible for an outlet opening for an airbag to be provided in a particularly simple manner without the use of additional components. If the frame and padding are not connected to each other in the region of the outlet opening, the padding is deformed, during the deployment of the airbag, by the force which the airbag applies to it, and thereby releases the path for the emergence of the airbag. The arrangement according to the invention is visually attractive because the opening is not seen. In addition, neither seams nor other known closure elements are necessary. As a result, firstly, a simple and therefore also cost-effective solution is proposed. Secondly, elements which may obstruct the emergence of the airbag are not provided.

The outlet opening may be arranged, for example, in that region of the motor vehicle seat which faces the side wall structure. If the direction of deployment points obliquely forward, a particularly advantageous positioning of the airbag arises during the deployment and in the deployed state.

BRIEF DESCRIPTION OF THE DRAWINGS

The invention will be explained in greater detail below with reference to the exemplary embodiment which is illustrated in the drawing, in which.

DETAILED DESCRIPTION OF THE DRAWINGS

Figure 1:
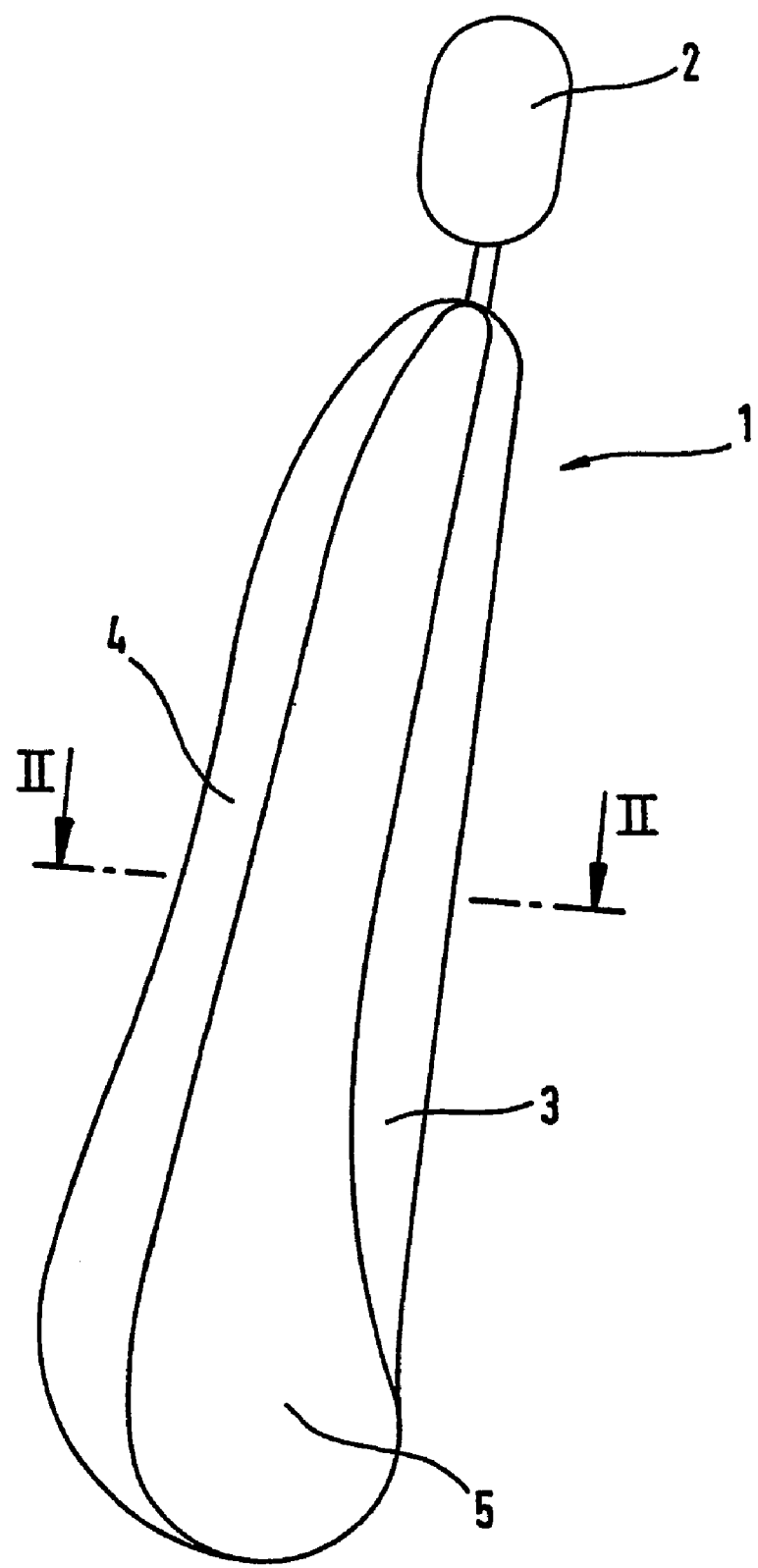
FIG. 1 shows a side view of a backrest of a motor vehicle seat, as seen from the side wall structure.

FIG. 1 illustrates a backrest 1 which, together with a seat cushion part (not illustrated), forms a motor vehicle seat. The backrest 1 has a head restraint 2. The side view reveals a backrest cover 3 which lines the rear part of the backrest 1. Also visible is padding 4 which forms that part of the backrest 1 which faces forward and enables a driver to sit comfortably. In the embodiment illustrated, a backrest frame 5 can also be seen. This is arranged visibly and forms part of the outer contour of the motor vehicle seat. However, it is also conceivable to line a backrest frame of this type in a suitable manner, for example by the backrest cover 3, which is pulled further forward in the side region of the motor vehicle seat, or by padding 4.

An airbag module is arranged in the backrest. This is revealed in FIG. 2 which shows a sectional illustration of that region of a backrest 1 which faces the motor vehicle side according to the line II—II in FIG. 1. The arrow A points to the rear in the direction of travel and the arrow B points forward in the direction of travel. The backrest cover 3 is illustrated in the region facing to the rear. In addition to covering the rear side of the backrest 1, said backrest cover covers parts of those side regions of the backrest 1 which point in the direction of the side wall structure. That side of the backrest 1 which faces forward is formed by the padding 4. This is attached to a padding support 6.

The frame 5 is arranged between the backrest cover 3 and padding 4. In the exemplary embodiment illustrated, the backrest cover 3, frame 5 and padding 4 form the outer contour of the backrest 1. They butt together in each case at the points 7 and 8. However, it is also conceivable for the frame 5 to be arranged in the interior of the backrest 1 and, for example, to be concealed by the backrest cover 3 and/or padding 4. In this case, the padding 4 and backrest cover 3 butt together on the outer contour of the seat.

Figure 2:
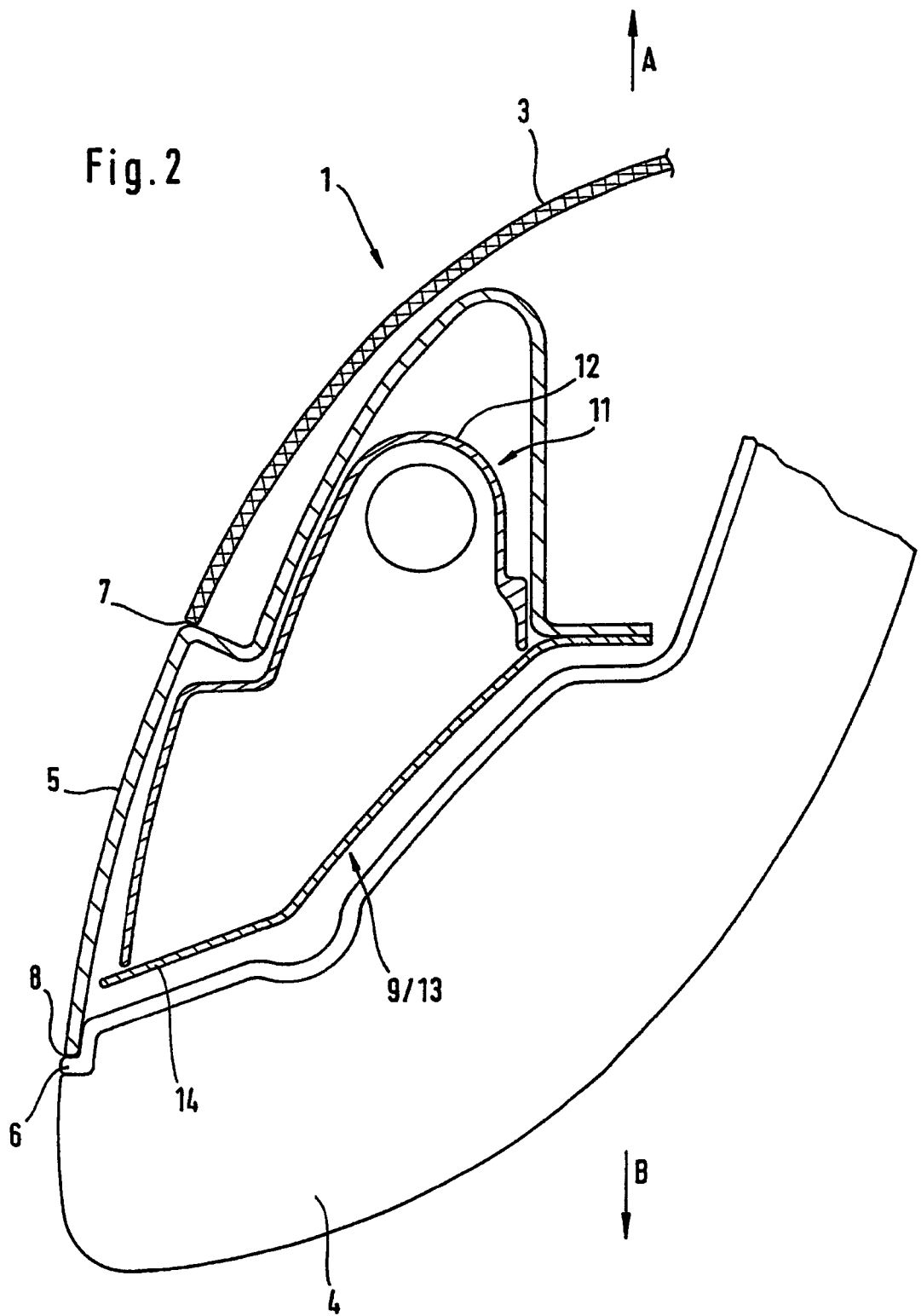
FIG. 2 shows a section through a side region of the motor vehicle seat, which region faces the side wall structure, together with a safety device according to the invention in the inoperative state in accordance with the line II—II in FIG. 1.

The frame 5 has an essentially U-shaped cross section, the opening 9 of which is directed forward. An airbag module 11 is arranged in the space surrounded by the U-shaped frame 5. The frame 5 therefore extends between the airbag module 11 and the side wall structure of the motor vehicle. The airbag module 11 comprises generally customary components which are not discussed in greater detail at this point. FIG. 2 illustrates an airbag housing 12, the cross-sectional shape of which is matched to that of the frame 5. An opening 13 of the airbag housing 12 points in the same direction as the opening 9 of the frame 5, namely in the direction of travel. The opening 13 of the airbag housing 12 is provided with a plate 14. The plate 14 is connected to the frame 5 at that end of the frame 5 which faces away from the outer contour of the backrest 1. The other end of the plate 14 bears against the airbag housing 12. The plate 14 is arranged between the airbag module 12 and the padding 4.

An airbag outlet opening is provided at the point 8, i.e. at the point at which the backrest frame 5 and padding support 6 butt together. The backrest frame 5 and padding 6 are not connected to each other in this region. They merely butt against each other and, on account of their shapes which are matched to each other, form a closed contour. The airbag outlet opening is thus not visible from the outside. Also, however, no additional elements or structures are necessary in order to close the opening.

Figure 3:
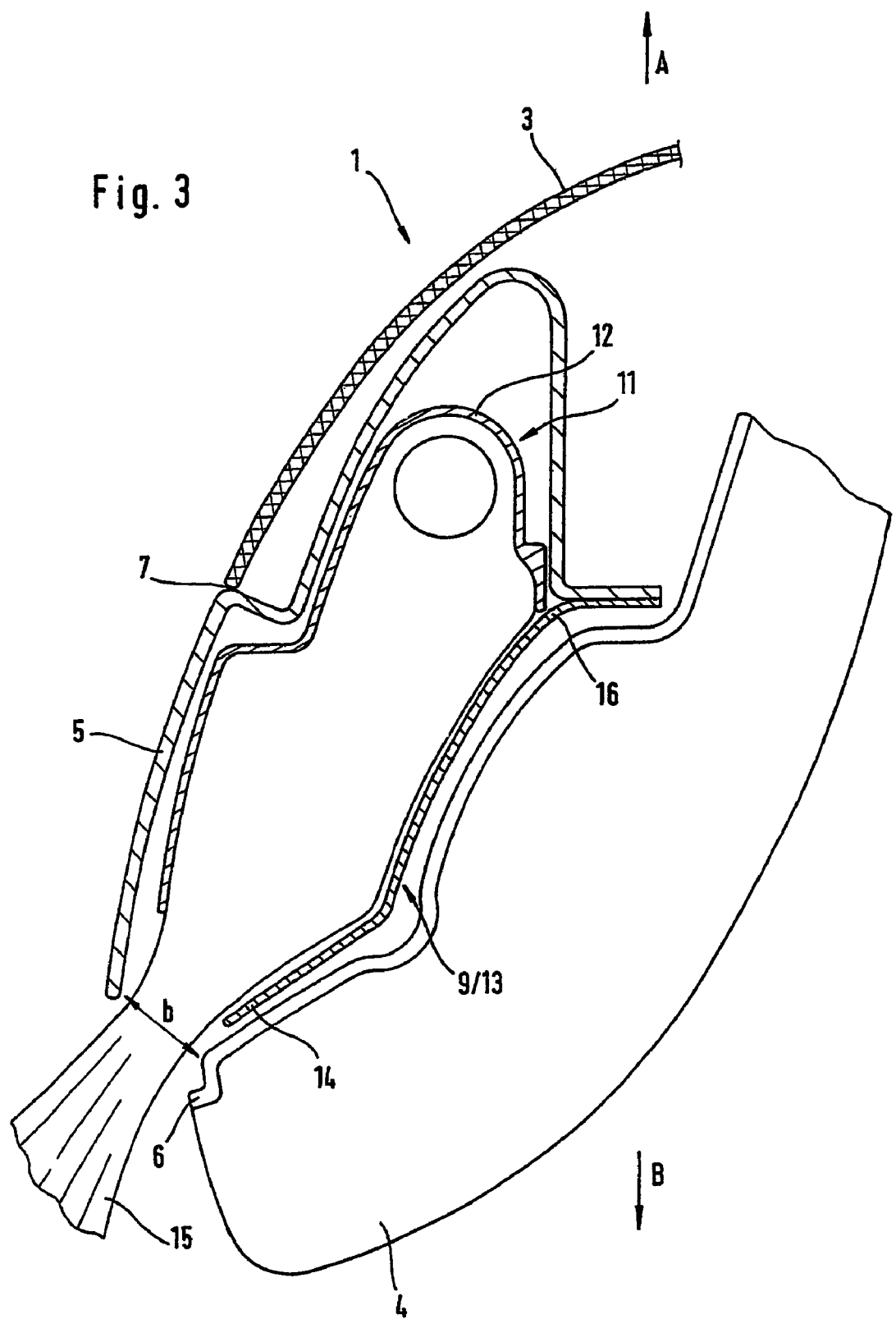
FIG. 3 shows a section corresponding to FIG. 2 with an activated safety device.

FIG. 3 illustrates a deploying airbag 15. The airbag 15 has already pressed the plate 14 outward as it deploys about a pivot axis 16. The plate 14 has, in turn, moved the padding support 6 together with the padding 4 attached on it. This results in the formation of an outlet gap or opening b which releases the path for the airbag. Owing to the airbag 15 first of all butting against the plate 14, the first pulse of the deploying airbag 15 is damped. This means that the airbag 15 emerges at a throttled speed. In addition, the plate 14 serves to open up the path for the emerging airbag 15. The frame 5 fulfills two tasks in relation to the safety device according to the invention. Firstly, it shields the safety device against applications of force from the region of the side wall and thereby prevents the outlet opening from becoming blocked. Secondly, it assists the airbag 15 in deploying in the correct direction.

The invention claimed is:

1. A safety device for a motor vehicle seat having a seat cushion part and a backrest, the backrest having a rigid frame, a backrest cover, which faces rearward as seen in the direction of travel, and padding which faces forward, as seen in the direction of travel, and an airbag module is integrated into the backrest, said airbag module being arranged in a region of the backrest which faces a side wall structure of the motor vehicle in such a manner that an airbag is deployed when there is an impact to the side wall of the motor vehicle, wherein the rigid frame surrounds the airbag module in at least a rear region of the airbag module which faces rearward as seen in the direction of travel and a side region of the airbag module which faces the side wall structure.

2. The safety device as claimed in claim 1, wherein the airbag module has a housing which at least partially surrounds the airbag in the folded up state.

3. The safety device as claimed in claim 2, wherein the housing surrounds the airbag in a region of the housing which faces rearward, as seen in the direction of travel, and in a side region of the housing which faces the side wall structure.

4. The safety device as claimed in claim 3, wherein a plate is provided in a region in which the housing does not surround the airbag module.

5. The safety device as claimed in claim 4, wherein the plate is connected at least on one side to the frame.

6. The safety device as claimed in claim 5, wherein an airbag outlet opening is provided between the frame and padding.

7. The safety device as claimed in claim 6, wherein the frames and padding are not connected to each other in the region of the airbag outlet opening.

8. The safety device as claimed in claim 7, wherein the padding is of elastic design in the region of the airbag outlet opening in such a manner that it permits the outlet opening to be open when the airbag is deployed.

9. The safety device as claimed in claim 8, wherein the airbag outlet opening is arranged in the region of the backrest which faces the side wall structure.

10. The safety device as claimed in claim 6, wherein the airbag outlet opening is arranged in a side region of the backrest which faces the side wall structure.

11. The safety device as claimed in claim 6, wherein the padding is of elastic design in the region of the airbag outlet opening in such a manner that it permits the outlet opening to be open when the airbag is deployed.

12. The safety device as claimed in claim 1, wherein an airbag outlet opening is provided between the frame and padding.

13. A safety device for a motor vehicle seat including a seat cushion part, a backrest having a rigid frame, a backrest cover, which faces rearward as seen in the direction of travel, and padding which faces forward, as seen in the direction of travel, the safety device comprising:
an airbag module including an airbag, the airbag module being integrated into the backrest and arranged in a region of the backrest which faces a side wall structure of the motor vehicle, wherein a rear region of the airbag module which faces rearward as seen in the direction of travel and a side region of the airbag module which faces the side wall structure are surrounded by the rigid frame.

14. The safety device as claimed in claim 13, wherein the airbag module includes a housing which at least partially surrounds the airbag when the airbag is in a folded-up state.

15. The safety device as claimed in claim 14, wherein the housing surrounds the airbag in a rear region of the housing which faces rearward, as seen in the direction of travel, and in a side region of the housing facing the side wall structure.

16. The safety device as claimed in claim 15, further comprising a plate in a region of the airbag that is not surrounded by the housing of the airbag module.

17. The safety device as claimed in claim 16, wherein the plate is connected at least on one side to the frame of the seat.

18. The safety device as claimed in claim 17, wherein an airbag outlet opening is provided between the frame and padding.

19. The safety device as claimed in claim 18, wherein the frame and padding are not connected to each other at the airbag outlet opening.

20. The safety device as claimed in claim 19, wherein the padding is of elastic design in a region of the airbag outlet opening in such a manner that it permits the outlet opening to be open when the airbag is deployed.

21. The safety device as claimed in claim 20, wherein the airbag outlet opening is arranged in the region of the backrest which faces the side wall structure.

22. A motor vehicle seat comprising
a seat cushion part;
a backrest including
a rigid frame,
a backrest cover, which faces rearward as seen in the direction of travel, and
padding which faces forward, as seen in the direction of travel, the safety device comprising;
an airbag module including an airbag, the airbag module being integrated into the backrest and arranged in a region of the backrest which faces a side wall structure of the motor vehicle, wherein a rear region of the airbag module which faces rearward as seen in the direction of travel and a side region of the airbag module which faces the side wall structure are surrounded by the rigid frame.

23. The motor vehicle seat as claimed in claim 22, wherein the airbag module includes a housing which at least partially surrounds the airbag when the airbag is in a folded-up state.

24. The motor vehicle seat as claimed in claim 23, wherein the housing surrounds the airbag in a rear region of the housing which faces rearward, as seen in the direction of travel, and in a side region of the housing facing the side wall structure.

25. The motor vehicle seat as claimed in claim 24, further comprising a plate in a region of the airbag that is not surrounded by the housing of the airbag module.

26. The motor vehicle seat as claimed in claim 25, wherein the plate is connected at least on one side to the frame.

27. The motor vehicle seat as claimed in claim 26, further comprising an airbag outlet opening between the frame and padding.

28. The motor vehicle seat as claimed in claim 27, wherein the frame and padding are not connected to each other at the airbag outlet opening.

29. The motor vehicle seat as claimed in claim 28, wherein the padding is of elastic design in a region of the airbag outlet opening in such a manner that it permits the outlet opening to be open when the airbag is deployed.

30. The motor vehicle seat as claimed in claim 29, wherein the airbag outlet opening is arranged in the region of the backrest which faces the side wall structure.

31. A method of making a safety device, comprising:
integrating an airbag module into a region of a vehicle seat's backrest which faces a side wall structure of the motor vehicle; and
surrounding a rear region of the airbag module which faces rearward as seen in the direction of travel and a side region of the airbag module which faces the side wall structure with a rigid frame of the backrest.

* * * * *